US011254588B2

(12) United States Patent
Yangali-Quintanilla et al.

(10) Patent No.: US 11,254,588 B2
(45) Date of Patent: Feb. 22, 2022

(54) METHOD FOR DOSING ANTISCALANT INTO A MEMBRANE-BASED WATER TREATMENT SYSTEM

(71) Applicant: GRUNDFOS HOLDING A/S, Bjerringbro (DK)

(72) Inventors: Victor Augusto Yangali-Quintanilla, Ulstrup (DK); Dominik Marek Dominiak, Lodz (PL); Wilhelmus Johannes Cornelis Van De Ven, Viborg (DK)

(73) Assignee: GRUNDFOS HOLDING A/S, Bjerringbro (DK)

(*) Notice: Subject to any disclaimer, the term of this patent is extended or adjusted under 35 U.S.C. 154(b) by 611 days.

(21) Appl. No.: 16/157,591

(22) Filed: Oct. 11, 2018

(65) Prior Publication Data

US 2019/0112202 A1 Apr. 18, 2019

(30) Foreign Application Priority Data

Oct. 13, 2017 (EP) .................................. 17 196 291

(51) Int. Cl.
   *B01D 61/02* (2006.01)
   *B01D 61/10* (2006.01)
   (Continued)

(52) U.S. Cl.
   CPC ............ *C02F 1/008* (2013.01); *B01D 61/025* (2013.01); *B01D 61/10* (2013.01); *B01D 61/12* (2013.01);
   (Continued)

(58) Field of Classification Search
   None
   See application file for complete search history.

(56) References Cited

U.S. PATENT DOCUMENTS

2009/0188861 A1\* 7/2009 Higgin ................... B01D 65/08
                                                                       210/636
2011/0240557 A1   10/2011 Goodfellow
(Continued)

FOREIGN PATENT DOCUMENTS

CN   201485335 U   5/2010
CN   201495122 U   6/2010
(Continued)

OTHER PUBLICATIONS

Amin Saad M Ed—Hilal Nidal: "Early discovery of RO membrane fouling and real-time monitoring of plant performance for optimizing cost of water", Desalinat, Elsevier, Amsterdam, NL, vol. 165, Aug. 15, 2004 (Aug. 15, 2004), pp. 183-191.
(Continued)

*Primary Examiner* — Hayden Brewster
(74) *Attorney, Agent, or Firm* — McGlew and Tuttle, P.C.

(57) ABSTRACT

A dosing pump (19) doses antiscalant into a membrane-based water treatment system (1). The dosing pump (19) includes a displacement body for pumping antiscalant into the membrane-based water treatment system (1) in doses. A motor drives the displacement body. A control module controls the motor. The control module is configured to vary the dosage of antiscalant pumped into the water treatment system (1) based on a temperature corrected system variable (SVTc) being based on a plurality of operating variables of the water treatment system (1).

20 Claims, 7 Drawing Sheets

(51) Int. Cl.
  *B01D 61/12* (2006.01)
  *C02F 1/469* (2006.01)
  *C02F 103/06* (2006.01)
  *C02F 1/00* (2006.01)
  *C02F 1/44* (2006.01)
  *B01D 65/08* (2006.01)
  *C02F 1/68* (2006.01)
  *B01D 65/02* (2006.01)

(52) U.S. Cl.
  CPC .............. *B01D 65/08* (2013.01); *C02F 1/441* (2013.01); *C02F 1/686* (2013.01); *B01D 65/02* (2013.01); *B01D 2321/16* (2013.01); *B01D 2321/40* (2013.01); *C02F 1/44* (2013.01); *C02F 1/442* (2013.01); *C02F 1/444* (2013.01); *C02F 1/445* (2013.01); *C02F 1/447* (2013.01); *C02F 1/4691* (2013.01); *C02F 1/4693* (2013.01); *C02F 2103/06* (2013.01); *C02F 2209/006* (2013.01); *C02F 2209/02* (2013.01); *C02F 2209/03* (2013.01); *C02F 2209/05* (2013.01); *C02F 2209/06* (2013.01); *C02F 2303/14* (2013.01); *C02F 2303/22* (2013.01)

(56) References Cited

U.S. PATENT DOCUMENTS

| | | | |
|---|---|---|---|
| 2013/0248444 A1* | 9/2013 | Subbiah | B01D 61/04 210/636 |
| 2017/0209834 A1 | 7/2017 | Cohen et al. | |
| 2019/0030489 A1* | 1/2019 | Ishii | C02F 5/10 |

FOREIGN PATENT DOCUMENTS

| | | |
|---|---|---|
| CN | 103347594 A | 10/2013 |
| CN | 103864230 A | 6/2014 |
| CN | 204360110 U | 5/2015 |
| CN | 204918179 U | 12/2015 |
| WO | 2012/069897 A1 | 5/2012 |

OTHER PUBLICATIONS

Hassan D et el: "Suppression of CaCO3 scale deposition by anti-scalants", Desalination, Elsevier, Amsterdam, NL, vol. 118, No. 1-3, Sep. 20, 1998 (Sep. 20, 1998), pp. 285-296.

* cited by examiner

METHOD FOR DOSING ANTISCALANT INTO A MEMBRANE-BASED WATER TREATMENT SYSTEM

CROSS REFERENCE TO RELATED APPLICATIONS

This application claims the benefit of priority under 35 U.S.C. § 119 of European Application 17 196 291.3, filed Oct. 13, 2017, the entire contents of which are incorporated herein by reference.

TECHNICAL FIELD

The present disclosure relates generally to a dosing pump for dosing antiscalant into a membrane-based water treatment system, a dosing system comprising such a pump and a method for dosing antiscalant into a membrane-based water treatment system. The membrane-based water treatment system may in particular be a reverse osmosis (RO) desalination system. However, the dosing pump, dosing system and method described herein may be used in any membrane-based desalination and water treatment application. This includes, but is not limited to municipal and industrial desalination, municipal water treatment, industrial water treatment, groundwater filtration, drinking water filtration, surface water filtration, high purity water, cooling water treatment, water reuse, brackish water filtration, seawater desalination, produced water and others.

BACKGROUND

Membrane-based water desalination and water treatment with reverse osmosis (RO) or nanofiltration (NF) is a popular technology that greatly contributes in solving the problem of water scarcity and water pollution in different countries regardless of geographical location. RO is a membrane technology that is well established and widely used in membrane-based water desalination (e.g. seawater, brackish water, treated wastewater, impaired waters, produced water and others) and water treatment (e.g. surface water, groundwater, water reuse).

A widely used performance indicator for such systems is "recovery" or "yield" being defined as the ratio between the outflow of permeate, i.e. water produced by the system, and the inflow of feed, i.e. water conveyed to the system. The water discharged by the system is referred to as concentrate or brine. Membrane-based water treatment systems may comprise one or more membranes. In a multiple-membrane system, the membranes may be arranged in series and/or in parallel, wherein the concentrate of membrane i may serve as feed to the subsequent membrane i+1.

The system recovery is always lower than 100%, and it depends on the salt content of the feed water and other factors like membrane scaling. Scaling is a type of membrane fouling that blocks the membrane and reduces its filtration and water diffusion performance. Scaling occurs when one or more scale forming salt species exceed their solubility limits, supersaturate and precipitate. The increased concentration of scale forming species occurs when the recovery (permeate water/feed water) increases, which enhances the concentration polarization in the region next to the membrane surface on the feed side. Therefore, the recovery is limited by scaling.

Furthermore, membrane fouling, particularly scaling, deteriorates membrane performance, which results in limited membrane life, higher use of pressure and thus energy, more frequent cleaning of the membrane and system downtime. The consequences are costly operating expenses and limited system performance. Scaling is a phenomenon where precipitation of minerals/salts in solution causes them to form nuclei that promote crystallization (mineral growth) and ultimately produce scaling (fouling) onto the membrane. Precipitation starts when the activity of ions reaches their saturation limit and the solution becomes supersaturated. The risk or extent of scaling can be reduced or even prevented by using a chemical additive known as antiscalant. Antiscalants are commercially available chemical products designed for being added into the feed water stream of a membrane system against scaling. Antiscalants usually come with a dosage recommendation by the antiscalant manufacturer to achieve a target recovery.

However, the most efficient dose of an antiscalant is highly application and system dependent. The antiscalant manufacturers' dosage recommendations are often overestimated to guarantee a promised target recovery in a wide range of applications and systems. Apart from an ineffective overconsumption of costly antiscalant, such overdosing of antiscalant creates operational problems, for instance a membrane's ability to be fully recovered by a cleaning-in place (CIP) can be negatively affected by an over-dosage of antiscalant. Overdosed and thus ineffective antiscalant may end up in the concentrate stream being discharged into an external water body or a sewer drain. This creates problems for water authorities and personal responsible for the wastewater treatment plant and constitutes an environmental pollution of the water receiving body (natural or wastewater treatment plant). As a result, the membrane-based water treatment system may be shut down by authorities or penalties may be imposed on operators of the system.

SUMMARY OF THE INVENTION

The dosing pump, dosing system and method disclosed herein provide a solution for dosing the least amount and/or flow of antiscalant necessary to achieve a target recovery in any membrane-based water treatment system it is used in, and thus to minimise or prevent overdosing of antiscalant.

In accordance with a first aspect of the present disclosure, a dosing pump is provided for dosing antiscalant into a membrane-based water treatment system. The dosing pump comprises
- a displacement body or impeller for pumping antiscalant into a membrane-based water treatment system in a dosed manner,
- a motor for driving the displacement body or impeller, and
- a control module for controlling the motor,
- wherein the control module is configured to vary the dosage of antiscalant pumped into the water treatment system based on a temperature corrected system variable (SVTc) being based on a plurality of operating variables of the water treatment system.

The term "membrane-based water treatment system" shall herein encompass any form of reverse osmosis (RO), forward osmosis (FO), membrane distillation (MD), electrodialysis (ED), nanofiltration (NF), microfiltration (MF), or ultrafiltration (UF) system, in particular desalination system, using membrane technology, e.g. graphene and carbon nanotubes membrane, ion exchange membrane, electrodialysis reversal (EDR) membrane, capacitive de-ionization membrane (CDI) and other types of membrane used in desalination and water treatment. In general, any membrane-based desalination and water treatment technology (e.g. RO, NF, FO, MD, ED, EDR, CDI) involving the use of antiscalants can be areas of application of the present disclosure.

The term "antiscalant" shall mean herein any form of chemical additive effective to reduce the risk or extent of membrane scaling, in particular membrane fouling. Antiscalants may for example be chelating agents, delay agents and/or dispersants. Chemical formulations used in antiscalants may be classified into solubility modifiers (e.g. polyphosphates, phosphonates, phosphates esters, polyacrylates, EDTA), crystal modifiers (e.g. polymaleic acid, sulfonated polystyrene), surfactants used for dispersion (e.g. metal sulphonates, metal phenolates, fatty acid phosphates), and others. Antiscalants may comprise combinations and/or blends of such formulations.

The term "dosage" of antiscalant shall mean herein an amount and/or flow of antiscalant. The dosing pump may pump antiscalant into the membrane-based water treatment system in a dosed manner by regulating a continuous flow of antiscalant into the membrane-based water treatment system. Alternatively, the flow of antiscalant into the membrane-based water treatment system may be discontinuous in regular or irregular intervals, wherein the dosage may be varied by the interval rate and/or the amount of antiscalant per interval. The dosing pump is preferably a displacement pump with a displacement body for displacing defined portions of water in order to be able to control the pumped dosage by controlling the number and/or frequency of displaced portions.

The term "temperature corrected system variable" (SVTc) may be defined as any system variable that is dependent on the scaling of the membrane and that includes a temperature correction. For instance, the temperature corrected system variable (SVTc) may be a temperature corrected net driving pressure (NDPTc). The term "net driving pressure" (NDP) may be defined herein as:

$$NDP = P_f - \frac{\Delta P_{fc}}{2} - P_p - \pi_{fc} + \pi_p,$$

wherein $P_f$ denotes the feed pressure, $\Delta P_{fc}$ is the difference between the feed pressure and the concentrate pressure, $P_p$ is the permeate pressure, $\pi_{fc}$ is the feed-concentrate osmotic pressure, and $\pi_p$ is the permeate osmotic pressure. The temperature corrected net driving pressure NDPTc may be defined as: NDPTc=NDP·TCF, wherein TCF is a temperature correction factor being a function of a membrane-specific temperature correction constant $C_t$ and the feed temperature $T_f$: TCF=f($C_t$, $T_f$).

The temperature corrected net driving pressure (NDPTc) is a preferred choice of the temperature corrected system variable (SVTc) in case the water treatment system is operated at an essentially constant permeate flow. If the throughput through the membrane drops due to scaling and fouling, a feed pump speed or power may be increased to achieve a constant permeate flow. The scaling and fouling of the membrane will then show as an increase in the temperature corrected net driving pressure (NDPTc).

An alternative choice of the temperature corrected system variable (SVTc) may be a temperature corrected permeate flow (PFTc) being defined herein as:

$$PFTc = \frac{Q_p}{TCF},$$

wherein $Q_p$ denotes the permeate flow and TCF is the same temperature correction factor as described above. If $Q_f$ is 10.0 m³/h and TCF=0.747, then PTFc would be 13.39 m³/h.

The temperature corrected permeate flow (PFTc) is a preferred choice of the temperature corrected system variable (SVTc) in case the water treatment system is operated at an essentially constant feed pressure and/or with a constant feed pump speed/power. If the throughput through the membrane drops due to scaling and fouling, the permeate flow drops and the scaling and fouling of the membrane will then show as a decrease in the temperature corrected permeate flow (PFTc). The dependency of PFTc from the scaling and fouling is thus inversely to the dependency of NDPTc from the scaling and fouling.

There are more options for temperature corrected system variable (SVTc) than NDPTc and PFTc. For instance, a temperature corrected water permeability (KWTc) being defined as $$KWTc = \frac{PFTc}{NDPTc \cdot A_m}$$

may serve as SVTc, wherein $A_m$ is the total membrane area. KWTc falls with scaling like PFTc. If PTFc was 13.39 m³/h, NDPTc was 5.57 bar and $A_m$ was 600 m², then KWTc would be 0.004 m/(bar·h).

Another example for a suitable SVTc may be a temperature corrected membrane resistance RMTc being defined as $$RMTc = \frac{NDPTc \cdot A_m \cdot 10^5}{PFTc \cdot \mu_{rt}},$$

wherein $\mu_{rt}$ is the water dynamic viscosity at a reference temperature. RMTc rises with scaling like NDPTc. If PTFc was 13.39 m³/h, NDPTc was 5.57 bar, $A_m$ was 600 m², and $\mu_{rt}$ was 8.9·10⁻⁴ N·S/m², then RMTc would be 2.3 10⁻¹¹ m⁻¹. KWTc and RMTc are examples for a combination of NDPTc and PTFc.

In the following, where SVTc is assumed to be NDPTc, the skilled reader will readily understand that PFTc, KWTc or RMTc could alternatively serve as SVTc, wherein PFTc and KWTc rise with scaling and NDPTc and RMTc fall with scaling.

A low value of NDPTc (and thus KWTc) and a high value of PTFc (and thus RMTc) are in principle desirable to achieve a high recovery. However, the value of NDPTc increases over time due to scaling, i.e. NDPTc may show a rising slope over time. During the development of the dosing pump described herein, investigations have revealed an unexpected correlation between the dosage of antiscalant and the temperature corrected net driving pressure NDPTc and/or the temperature corrected permeate flow PFTc. It was shown that the slope of NDPTc, i.e. the first time derivative of NDPTc, i.e. ΔNDPTc/Δt, not only increases when the dosage is below a minimal dosage, but also increases when the dosage is above a maximum dosage. Analogously, the slope of PFTc, i.e. the first time derivative of PFTc, i.e. ΔPFTc/Δt, was shown not only to decrease when the dosage is below a minimal dosage, but also to decrease when the dosage is above a maximum dosage. Furthermore, the investigations have shown that, within a relatively wide range of antiscalant dosage between the minimal dosage and the maximum dosage, the antiscalant dosage has almost no influence on the slope of SVTc, i.e. $\Delta SVTc/\Delta t$. Thus, it is desirable to operate as close as possible to the minimal dosage in order not to waste ineffective (and in excess even harmful) antiscalant. The control module of the present dosing pump is thus configured to make use of this finding by varying the dosage of antiscalant in dependence of NDPTc and/or $\Delta NDPTc/\Delta t$, and thereby optimizing the antiscalant consumption to a minimum. In case of PFTc as SVTc, the dosage of antiscalant is varied in dependence of PFTc and/or $\Delta PFTc/\Delta t$, and thereby optimizing the antiscalant consumption to a minimum.

Optionally, the control module may be configured to receive and/or determine the temperature corrected system variable SVTc. Thus, the calculation of SVTc may be performed by the control module or by a calculation module being remotely located from the dosing pump. The decision algorithm to determine whether at all and/or by how much the dosage of antiscalant is reduced may be also performed by the control module and/or remotely by a calculation module. If SVTc is calculated remotely and the decision algorithm for dosage change is performed within the control module, the control module may receive the calculated SVTc from a remote calculation module. Alternatively or in addition, the decision algorithm may at least partially be performed remotely, wherein the control module may be configured to receive a command whether at all and/or by how much the dosage of antiscalant is to be changed.

Optionally, the plurality of operating variables of the water treatment system may comprise at least one of the group consisting of: feed electrical conductivity, feed temperature, feed pH, difference between feed pressure and concentrate pressure, permeate pressure, permeate temperature and permeate electrical conductivity. In case of a multiple-membrane system with multiple membrane vessels in series, the difference between feed pressure and concentrate pressure may be determined at the last membrane vessel in the series. Preferably, the operating variables feed electrical conductivity, feed temperature and the difference between feed pressure and concentrate pressure at the last membrane vessel are at least used to determine SVTc. A plurality of at least four sensors, i.e. a feed electrical conductivity sensor, a feed temperature sensor, a feed pressure sensor at the last membrane vessel and a concentrate pressure sensor at the last membrane vessel, may provide these operating variables for determining SVTc. An additional feed pH sensor may be used to monitor the feed for major changes in the chemical composition of the feed. A plurality of three more sensors, i.e. a permeate electrical conductivity sensor, a permeate temperature sensor and a permeate pressure sensor may provide more operating variables for determining NDPTc more accurately. A permeate flow sensor may be useful to measure the permeate flow for the determination of PFTc. SVTc may be determined in a calculation module being remotely located from the dosing pump and in signal communication with the control module and the plurality of sensors. Alternatively or in addition, SVTc may be determined by the control module itself being in signal communication with the plurality of sensors. The signal communication may be via cable connection or wireless with corresponding transmitters and receivers. The control module and/or the calculation module may be in one-way or two-way communication with a database and/or computing cloud comprising one or more processors and servers.

In case the information of one or more of the permeate sensors, e.g. the permeate electrical conductivity sensor, the permeate temperature sensor and/or the permeate pressure sensor, is not available, the permeate pressure $P_p$ and/or the permeate osmotic pressure $\pi_p$ may be approximated to be a constant C or zero. In this situation, the temperature corrected net driving pressure may be determined as $$NDPTc = TCF \cdot \left( P_f - \frac{\Delta P_{fc}}{2} - \pi_{fc} - C \right)$$

based on the operating variables feed pressure $P_f$, feed electrical conductivity $\gamma_f$, feed temperature $T_f$ and the difference between feed pressure and concentrate pressure at the last membrane vessel $\Delta P_{fc}$.

The variables feed electrical conductivity $\gamma_f$ and feed temperature $T_f$ are used to determine the temperature correction factor TCF and the feed-concentrate osmotic pressure $\pi_{fc}$. The formula for the temperature correction factor TCF depends on the membrane type and may thus be provided by the membrane manufacturer. A plurality of TCF formula options may be stored in a database for a plurality of membrane types and products. The correct TCF formula may be selected from the database dependent on the membrane type used in the water treatment system. For instance, TCF for a composite membrane at a reference temperature of 25° C. may be given by:

$$TCF = e^{2700 \cdot \left( \frac{1}{298} - \frac{1}{T_f} \right)},$$

wherein the actual feed temperature $T_f$ is input in ° K. For instance, if $T_f$ is 15° C., i.e. 288.15° K, TCF may be 0.734. If there is no TCF formula given or available for the used membrane type, a default TCF formula may be assumed to be: $TCF = 1.03^{(T_f - 298)}$, wherein the actual feed temperature $T_f$ is input in ° K. For example, if $T_f$ is 15° C., i.e. 288.15° K, default TCF may be 0.747.

The osmotic pressure $\pi$ may be derived of the van't Hoff formula $\pi = R \cdot T \cdot \phi \cdot \Sigma_i \alpha_i c_i$, wherein R is the universal gas constant, T is the temperature in ° K, $\phi$ is the osmotic coefficient, $\alpha_i$ is the activity coefficient for ionic species i and $c_i$ is the concentration of ionic species i. The feed-concentrate osmotic pressure $\pi_{fc}$ may be deduced therefrom to be:

$$\pi_{fc} = 2.654 \cdot T_f \cdot \frac{c_{fc}}{10^6 - c_{fc}},$$

wherein the actual feed temperature $T_f$ is input in ° K and $c_{fc}$ is the concentration of salts in the feed-concentrate. The concentration of salts in the feed-concentrate $c_{fc}$ can be derived from the concentration of salts in the feed $c_f$ by making use of the known total recovery Rec:

$$c_{fc} = -CP \cdot c_f \cdot \frac{\ln(1 - Rec)}{Rec},$$

wherein CP is the water-dependent concentration polarization factor typically in the range of 1 to 2, e.g. CP=1.1 for low brackish groundwater. The concentration of salts in the feed $c_f$ in units of mg/l may be determined by using the measurement of the feed electrical conductivity $\gamma_f$ in units of µS/cm: $c_f = 0.76 \cdot \gamma_f - 3.07$. For example, if $\gamma_f$ is 1500 µS/cm, $c_f$ is 1136.93 mg/l. If the total recovery is 70% for an application in low brackish groundwater, i.e. CP=1.1, the concentration of salts in the feed-concentrate $c_{fc}$ is 2151 mg/l, which results in a feed-concentrate osmotic pressure $\pi_{fc}$ of 1.65 bar.

NDP and NDPTc are now available assuming zero permeate pressure $P_p$ and zero permeate osmotic pressure $\pi_p$. If the measured permeate pressure $P_p$ and the measured permeate electrical conductivity $\gamma_p$ are available from respective sensors, however, the net driving pressure NDP and thus the temperature corrected net driving pressure NDPTc may be more precisely determined by adding the measured permeate pressure $P_p$ to NDP and subtracting the permeate osmotic pressure $\pi_p$ from NDP. As the concentration of salts in the permeate is in general quite low, the osmotic pressure $\pi_p$ in units of bar may be derived directly from the measured permeate electrical conductivity $\gamma_p$ in units of μS/cm by: $\pi_p = 7.49 \cdot 10^{-4} \cdot \gamma_p - 0.19 \cdot 10^{-3}$. For instance, if the permeate electrical conductivity $\gamma_p$ is 13 μS/cm, $\pi_p$ would be 0.01 bar.

Thus, if the feed pressure sensor shows 9.41 bar, the concentrate pressure sensor shows 9.11 bar, the permeate pressure sensor shows 0.03 bar, the feed electrical conductivity sensor shows 1500 μS/cm, the permeate electrical conductivity sensor shows 13 μS/cm and the feed temperature sensor shows 15° C., NDP would be 7.59 bar and NDPTc would be 5.57 bar for a membrane with TCF=0.734 at 15° C.

Optionally, the control module may be configured to recursively adapt the dosage of antiscalant pumped into the water treatment system based on a previously determined temperature corrected system variable SVTc as feedback value. Alternatively or in addition, the control module may be configured to adapt the dosage of antiscalant pumped into the water treatment system upon a change of the slope of the temperature corrected system variable ($\Delta$SVTc/$\Delta$t). The control module may thus be configured to perform a closed-loop regulation of the dosage of antiscalant with SVTc and/or $\Delta$SVTc/$\Delta$t as feedback value. The slope of SVTc, i.e. $\Delta$SVTc/$\Delta$t, may be approximated by determining SVTc($t_1$) at a first point in time $t_1$ and SVTc($t_2$) at a second point in time $t_2$ and calculating the differential $\Delta$SVTc=SVTc($t_2$)−SVTc($t_1$) for the time interval $\Delta t = t_2 - t_1$.

Optionally, the control module may be configured to recursively reduce the dosage of antiscalant pumped into the water treatment system as long as the slope of the temperature corrected net driving pressure ($\Delta$NDPTc/$\Delta$t) does not increase and/or as long as the slope of the temperature corrected permeate flow ($\Delta$PFTc/$\Delta$t) does not decrease. A recursion loop may be repeated after the time interval $\Delta$t and $\Delta$SVTc/$\Delta$t of the current loop may be compared with $\Delta$SVTc/$\Delta$t of the previous loop. If $\Delta$SVTc/$\Delta$t of the current loop k is within limits, e.g. 1%, the same as $\Delta$SVTc/$\Delta$t of the previous loop k−1, $\Delta$SVTc/$\Delta$t has not changed. The limits may be pre-determined and/or set by a user and/or depend on the accuracy and precision at which SVTc is determined. The amount by which the dosage of antiscalant is reduced per recursion loop may be a pre-determined amount and/or set by the user and/or dependent on the chosen time interval $\Delta$t used for determining $\Delta$SVTc/$\Delta$t. The longer the chosen time interval $\Delta$t is, the larger can the amount of reduction per recursion loop be and vice versa. The time interval $\Delta$t may be pre-determined and/or set by a user and/or automatically adapted to the volatility of SVTc and/or $\Delta$SVTc/$\Delta$t. The higher the volatility of SVTc and/or $\Delta$SVTc/$\Delta$t is, the shorter the time interval $\Delta$t may be chosen and vice versa. In case of statistical fluctuations of SVTc, SVTc may be sampled to an average value of SVTc over a certain number of samples or low-pass filtered. For instance, if SVTc is sampled at a sampling rate of 1 Hz over a sliding window of 16 seconds, 16 values of SVTc may be recorded for the sliding window. The first 12 samples may be averaged to $SVTc_1$ of a first window part and the last 4 samples may be averaged to $SVTc_2$ of a second window part. $\Delta$SVTc/$\Delta$t may then be determined as ($SVTc_2 - SVTc_1$)/8 s.

Optionally, the control module may be configured to increase the dosage of antiscalant pumped into the water treatment system if the slope of the temperature corrected net driving pressure $\Delta$NDPTc/$\Delta$t has increased and/or if the slope of the temperature corrected permeate flow $\Delta$PFTc/$\Delta$t has decreased. As above, a recursion loop may be repeated after the time interval $\Delta$t, and $\Delta$SVTc/$\Delta$t of the current loop with the current dosage may be compared with $\Delta$SVTc/$\Delta$t of the previous loop with the previous dosage. If $\Delta$NDPTc/$\Delta$t of the current loop is above a limit, e.g. 1.01·$\Delta$NDPTc/$\Delta$t of the previous loop, $\Delta$NDPTc/$\Delta$t has increased. Analogously, if $\Delta$PFTc/$\Delta$t of the current loop is below a limit, e.g. 0.99·$\Delta$PFTc/$\Delta$t of the previous loop, $\Delta$PFTc/$\Delta$t has decreased. The control module thus increases the dosage for the subsequent recursion loop. As above, the limits may be pre-determined and/or set by a user and/or depend on the accuracy and precision at which SVTc is determined. Also, the amount $\Delta$D by which the dosage of antiscalant is increased for the next recursion loop may be a pre-determined amount and/or set by the user and/or dependent on the chosen time interval $\Delta$t used for determining $\Delta$SVTc/$\Delta$t. The longer the chosen time interval $\Delta$t is, the larger can the amount $\Delta$D of reduction per recursion loop be and vice versa. The time interval $\Delta$t may be pre-determined and/or set by a user and/or automatically adapted to the volatility of SVTc and/or $\Delta$SVTc/$\Delta$t. The higher the volatility of SVTc and/or $\Delta$SVTc/$\Delta$t is, the shorter the time interval $\Delta$t may be chosen and vice versa. The values of $\Delta$t and/or the amount $\Delta$D by which the dosage is adapted may be the same or different between the case when $\Delta$NDPTc/$\Delta$t has not increased and the case when $\Delta$NDPTc/$\Delta$t has increased.

Optionally, the control module may be configured to recursively increase the dosage of antiscalant pumped into the water treatment system as long as the slope of the temperature corrected net driving pressure ($\Delta$NDPTc/$\Delta$t) is above an initial slope ($\Delta NDPTc_0/\Delta t$) and/or as long as the slope of the temperature corrected permeate flow ($\Delta$PFTc/$\Delta$t) is below an initial slope ($\Delta PFTc_0/\Delta t$), e.g. the initial slope determined when operating with a recommended dosage of antiscalant.

The dosing pump as described above may be applied in a water treatment system being already equipped with a plurality of sensors used for other purposes. Quite often, feed pressure, feed pH, feed temperature, feed electrical conductivity and concentrate pressure are monitored for surveillance purposes in water treatment systems anyway. Such sensors may be used to determine the operating variables on which the determination of SVTc is based. The control module may simply be in communication with the sensors to determine SVTc from the operating variables or may receive an already determined SVTc from a calculation module in order to adapt the dosage of antiscalant accordingly. Alternatively or in addition, a calculation module may also perform the decision algorithm for adapting the dosage of antiscalant and send a respective command for increase/reduction of the dosage to the control module.

However, according to a second aspect of the present disclosure, a dosing system for dosing antiscalant into a membrane-based water treatment system is provided, wherein the dosing system comprises a dosing pump as described above, and
a plurality of sensors for determining a plurality of operating variables of the water treatment system,
wherein the control module is configured to vary the dosage of antiscalant pumped into the water treatment system based on a temperature corrected system variable SVTc being based on a plurality of operating variables of the water treatment system determined by the plurality of sensors.

The dosing system thus comprises the sensors required to determine the operating variables on which the determination of SVTc is based. This is in particular useful if the water treatment system is not yet equipped with such a plurality of sensors.

Optionally, the dosing system may comprise a calculation module configured to determine the temperature corrected system variable SVTc. The calculation module may be implemented on a local or remote programmable logic controller (PLC) or programmable logic relay (PLR) for processing the sensor signals and calculating SVTc. The calculation module may be configured to receive the plurality of operating variables of the water treatment system from the plurality of sensors. Thus, the calculation module may be remotely located from the dosing pump and in signal communication with the control module and the plurality of sensors. The calculation module may be configured to calculate SVTc and to perform the decision algorithm whether at all and/or by how much the dosage of antiscalant is to be changed. The calculation module may then command the control module to increase or decrease the dosage of antiscalant accordingly.

According to a third aspect of the present disclosure, a method for dosing antiscalant into a membrane-based water treatment system is provided, the method comprising the steps of:

determining a temperature corrected system variable SVTc based on a plurality of operating variables of the water treatment system, varying the dosage of antiscalant fed into the water treatment system based on the temperature corrected system variable SVTc.

Optionally, the plurality of operating variables of the water treatment system may comprise at least one of the group consisting of: feed electrical conductivity, feed temperature, feed pH, difference between feed pressure and concentrate pressure, permeate pressure, permeate temperature and permeate electrical conductivity.

Optionally, the step of varying the dosage may comprise recursively adapting the dosage of antiscalant fed into the water treatment system based on a previously determined temperature corrected net system variable SVTc as feedback value.

Optionally, the step of varying the dosage may comprise adapting the dosage of antiscalant fed into the water treatment system upon a change of the slope of the temperature corrected system variable ($\Delta$SVTc/$\Delta$t).

Optionally, the temperature corrected system variable (SVTc) may be a temperature corrected net driving pressure (NDPTc) and/or a temperature corrected permeate flow (PFTc) and/or a combination thereof.

Optionally, the step of varying the dosage may comprise recursively reducing the dosage of antiscalant fed into the water treatment system as long as the slope of the temperature corrected net driving pressure ($\Delta$NDPTc/$\Delta$t) does not increase and/or as long as the slope of the temperature corrected permeate flow ($\Delta$PFTc/$\Delta$t) does not decrease.

Optionally, the step of varying the dosage may comprise increasing the dosage of antiscalant fed into the water treatment system if the slope of the temperature corrected net driving pressure ($\Delta$NDPTc/$\Delta$t) has increased and/or if the slope of the temperature corrected permeate flow ($\Delta$PFTc/$\Delta$t) has decreased.

Optionally, the step of varying the dosage may comprise recursively increasing the dosage of antiscalant pumped into the water treatment system as long as the slope of the temperature corrected net driving pressure ($\Delta$NDPTc/$\Delta$t) is above an initial slope ($\Delta$NDPTc$_0$/$\Delta$t) and/or as long as the slope of the temperature corrected permeate flow ($\Delta$PFTc/$\Delta$t) is below an initial slope ($\Delta$PFTc$_0$/$\Delta$t), e.g. the initial slope determined when operating with a recommended dosage of antiscalant.

Optionally, the method may further comprise a step of monitoring the temperature corrected net driving pressure NDPTc against a maximum threshold value (NDPTc$_{max}$) and/or monitoring the temperature corrected permeate flow PFTc against a minimum threshold value (PFTc$_{min}$), and a step of requesting a cleaning-in-place (CIP) of a membrane if the temperature corrected net driving pressure NDPTc exceeds the maximum threshold value (NDPTc$_{max}$) and/or if the temperature corrected permeate flow PFTc falls below the minimum threshold value (PFTc$_{min}$).

Optionally, the method may further comprise a step of monitoring the feed temperature against a minimum threshold value ($T_{f,min}$) and a maximum threshold value ($T_{f,max}$), a step of monitoring the feed pH against a minimum threshold value (pH$_{f,min}$) and a maximum threshold value (pH$_{f,max}$), and a step of resetting the dosage of antiscalant to an initial value, e.g. a recommended dosage by the antiscalant manufacturer, if the feed temperature and/or the feed pH exceeds the respective maximum threshold value or falls below the respective minimum threshold value.

Some or all of the steps of the method described above may be implemented in form of compiled or uncompiled software code that is stored on a computer readable medium with instructions for executing the method. Alternatively or in addition, some or all method steps may be executed by software in a cloud-based system, in particular the calculation module may be partly or in full implemented in a cloud-based system.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF PREFERRED EMBODIMENTS

Figure 1:
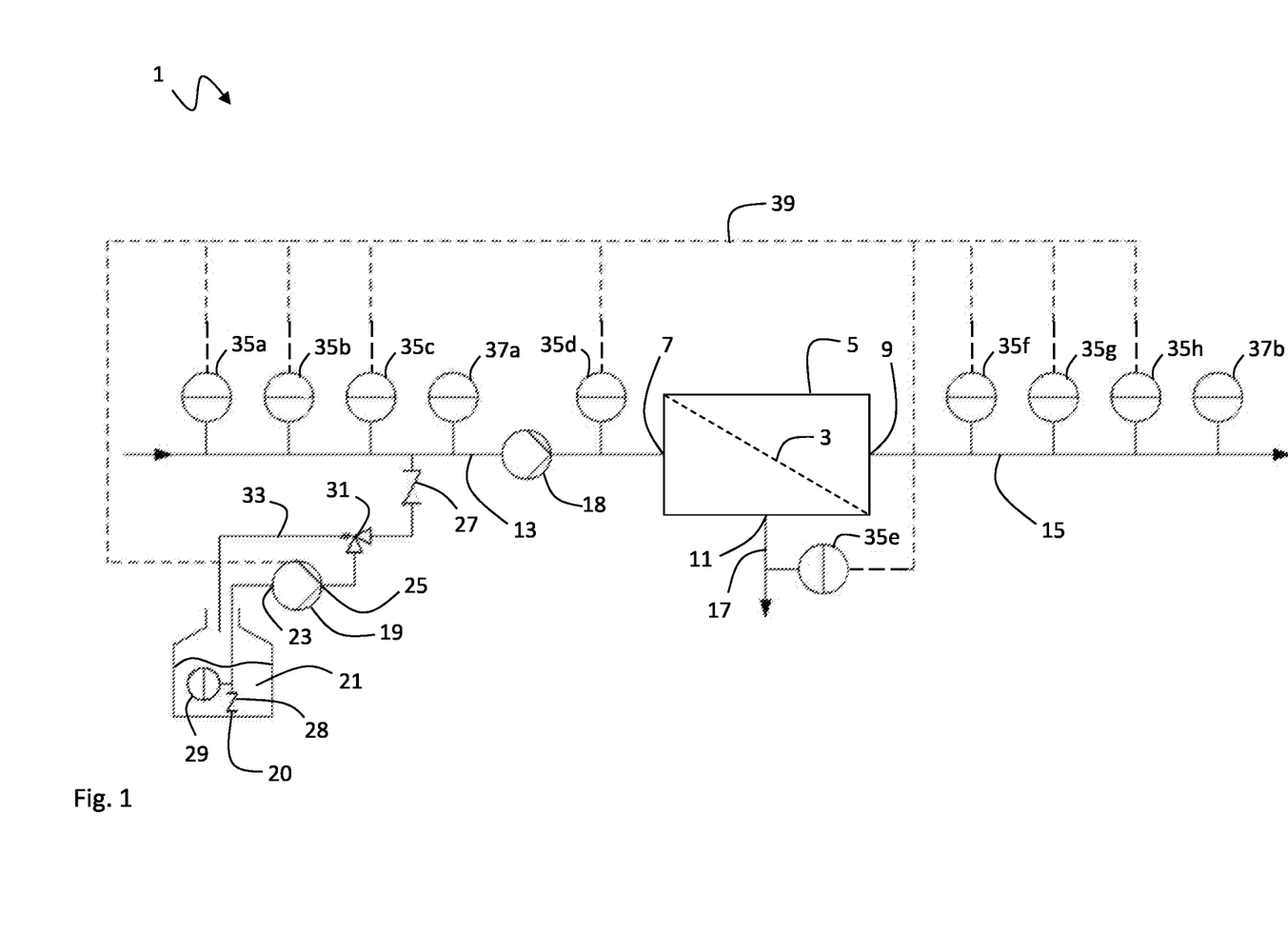
FIG. 1 is a schematic view showing a membrane-based water treatment system with an example of a first embodiment of the dosing system described herein.

FIG. 1 shows a schematic illustration of a membrane-based water treatment system 1 in form of a reverse osmosis desalination system comprising a membrane 3 in a vessel 5 with an inlet port 7, an outlet port 9 and a discharge port 11. It should be noted that the membrane 3 in a vessel 5 may be a system of a plurality of membranes in vessels arranged in parallel and/or in series. The inlet port 7 is in fluid connection with a feed line 13, the outlet port is in fluid connection with a permeate line 15 and the discharge port 11 is in fluid connection with a concentrate line 17. Salt water or brackish water to be desalinated is fed by a feed pump 18 into the vessel 5 via the feed line 13 and desalinated fresh water is output into the permeate line 15. Concentrate, also referred to as brine, having a high concentration of salt is discharged through the concentrate line 17. Over time and usage of the system 1, the membrane 3 may show scaling and fouling reducing the system performance.

Therefore, the membrane-based water treatment system 1 is equipped with a first embodiment of a dosing system for dosing antiscalant into the feed line 13 of the membrane-based water treatment system 1. The dosing system comprises a dosing pump 19 for dosing antiscalant from an antiscalant reservoir 21 into the feed line 13. An inlet port 23 of the dosing pump 19 is in fluid connection with an intake port 20 within the antiscalant reservoir 21 and an outlet port 25 of the dosing pump 19 is in fluid connection with the feed line 13. A check valve 27 before the feed line 13 prevents water pressure in the feed line 13 from pushing back antiscalant towards the dosing pump 19. Another check valve 28 upstream the inlet port 23 of the dosing pump 19 and downstream of the intake port 20 prevents antiscalant pressure in the reservoir 21 from pushing antiscalant towards the dosing pump 19. The filling level of antiscalant in the reservoir 21 is monitored by a fluid level sensor 29 controlling an angled valve 31 downstream of the outlet port 25 of the dosing pump 19 via a signal line 33. The angled valve 31 may be shut if the level of antiscalant in the reservoir 21 falls below a minimum threshold.

The dosing system further comprises a plurality of sensors 35, i.e. eight sensors, for determining a plurality of operating variables, i.e. eight variables, of the water treatment system 1. The feed line 13 is equipped with a feed electrical conductivity sensor 35a, a feed temperature sensor 35b, a feed pH sensor 35c and a pressure sensor 35d. The feed line 13 is further equipped with a feed flow sensor 37a for measuring the flow in the feed line 13. The feed electrical conductivity sensor 35a, the feed temperature sensor 35b, the feed pH sensor 35c and the feed flow sensor 37a are located upstream of the feed pump 18, whereas the feed pressure sensor 35d is located downstream of the feed pump 18 and upstream of the vessel 5. A concentrate pressure sensor 35e is located downstream the discharge port 11 at the discharge line 17 for determining the concentrate pressure $P_c$. The permeate line 15 is equipped with a permeate pressure sensor 35f, a permeate temperature sensor 35g and a permeate electrical conductivity sensor 35h of the dosing system. Furthermore, the permeate line 15 is equipped with a permeate flow sensor 37b, which may be used to determine a temperature corrected permeate flow PFTc. The permeate pressure sensor 35f is located closest to the vessel 5 downstream the outlet port 9. The eight sensors 35 of the dosing system are in signal communication with a control module, comprising one or more processors, of the dosing pump 19 via wireless or cabled signal line 39 with associated transmitters and receivers. The control module of the dosing pump 19 is configured to receive and process the operating variables provided by the sensors 35 via signal line 39. The control module of the dosing pump 19 determines here a temperature corrected net driving pressure NDPTc as temperature corrected system variable SVTc based on the plurality of received operating variables and varies the dosage of antiscalant fed into the feed line 13 based on the determined NDPTc.

The control module of the dosing pump 19 determines a net driving pressure (NDP) by:

$$NDP = P_f - \frac{\Delta P_{fc}}{2} - P_p - \pi_{fc} + \pi_p,$$

wherein $P_f$ denotes the feed pressure, $\Delta P_{fc}$ is the difference between the feed pressure $P_f$ and the concentrate pressure $P_c$, $P_p$ is the permeate pressure, $\pi_{fc}$ is the feed-concentrate osmotic pressure, and $\pi_p$ is the permeate osmotic pressure. NDPTc may then be determined by: NDPTc=NDP·TCF, wherein TCF is a temperature correction factor being a function of a membrane-specific temperature correction constant $C_f$ and the feed temperature $T_f$: TCF=f($C_f$, $T_f$).

The output of the feed pressure sensor 35d, i.e. feed pressure $P_f$, and of the concentrate pressure sensor 35e, i.e. concentrate pressure $P_c$, are combined to the differential pressure $\Delta P_{fc}=P_f-P_c$ as one of the operating variables for determining NDPTc. The variables feed electrical conductivity $\gamma_f$ and feed temperature $T_f$ are used to determine the temperature correction factor TCF and the feed-concentrate osmotic pressure $\pi_{fc}$. The temperature correction factor TCF depends on the membrane type and is thus provided by the membrane manufacturer. A plurality of TCF formula options is stored in a database for a plurality of membrane types and products. The correct TCF formula may be selected from the database dependent on the membrane type used in the water treatment system. For instance, TCF for a composite membrane may be given as:

$$TCF = e^{2700 \cdot \left(\frac{1}{298} - \frac{1}{T_f}\right)},$$

wherein the actual feed temperature $T_f$ is input in ° K. For instance, if $T_f$ is 15° C., i.e. 288.15° K, TCF may be 0.734. If there is no TCF formula given or available for the used membrane type, a default TCF formula may be assumed to be: TCF=1.03$^{(T_f-298)}$, wherein the actual feed temperature $T_f$ is input in ° K. For example, if $T_f$ is 15° C., i.e. 288.15° K, default TCF may be 0.747. The TCF formula may be a user-defined configuration parameter of the dosing pump 19 when it is installed to a certain water treatment system 1. A user may select the correct TCF formula when the dosing pump 19 is initialised or re-configured.

The osmotic pressure π may be derived of the van't Hoff formula $\pi = R \cdot T \cdot \phi \cdot \Sigma_i a_i c_i$, wherein R is the universal gas constant, T is the temperature in °K, φ is the osmotic coefficient, $a_i$ is the activity coefficient for ionic species i and $c_i$ is the concentration of ionic species i. The feed-concentrate osmotic pressure $\pi_{fc}$ may be deduced therefrom to be:

$$\pi_{fc} = 2.654 \cdot T_f \cdot \frac{c_{fc}}{10^6 - c_{fc}},$$

wherein the actual feed temperature $T_f$ is input in °K and $c_{fc}$ is the concentration of salts in the feed-concentrate. The concentration of salts in the feed-concentrate $c_{fc}$ can be derived from the concentration of salts in the feed $c_f$ by making use of the total recovery Rec:

$$c_{fc} = -CP \cdot c_f \cdot \frac{\ln(1 - Rec)}{Rec},$$

wherein CP is the water-dependent concentration polarization factor typically in the range of 1 to 2, e.g. CP=1.1 for low brackish groundwater. Recovery Rec=$Q_p/Q_f$ may be assumed to be a given fixed nominal target value, typically in the range of 30% to 90%, or may be determined from the measurements of the flow sensors 37a,b.

The concentration of salts in the feed $c_f$ in units of mg/l may be determined by using the measurement of the feed electrical conductivity $\gamma_f$ in units of μS/cm: $c_f = 0.76 \cdot \gamma_f - 3.07$. For example, if $\gamma_f$ is 1500 μS/cm, $c_f$ is 1136.93 mg/l. If the total recovery is 70% for an application in low brackish groundwater, i.e. CP=1.1, the concentration of salts in the feed-concentrate $c_{fc}$ is 2151 mg/l, which results in a feed-concentrate osmotic pressure $\pi_{fc}$ of 1.65 bar.

NDP and NDPTc may now already be available if the permeate pressure $P_p$ and zero permeate osmotic pressure $\pi_p$ can be assumed to be constants or zero in case no permeate sensors 35f-h were available. However, the measured permeate pressure $P_p$ and the measured permeate electrical conductivity $\gamma_p$ are available from respective sensors 35f-h in the shown example. The net driving pressure NDP and thus the temperature corrected net driving pressure NDPTc may be more precisely determined by adding the measured permeate pressure $P_p$ to NDP and subtracting the permeate osmotic pressure $\pi_p$ from NDP. As the concentration of salts in the permeate is generally quite low, the osmotic pressure $\pi_p$ in units of bar may be derived directly from the measured permeate electrical conductivity $\gamma_p$ in units of μS/cm by: $\pi_p = 7.49 \cdot 10^{-4} \cdot \gamma_p - 0.19 \cdot 10^{-3}$. For instance, if the permeate electrical conductivity $\gamma_p$ is 13 μS/cm, $\pi_p$ would be 0.01 bar.

Thus, if the feed pressure sensor shows 9.41 bar, the concentrate pressure sensor shows 9.11 bar, the permeate pressure sensor shows 0.03 bar, the feed electrical conductivity sensor shows 1500 μS/cm, the permeate electrical conductivity sensor shows 13 μS/cm and the feed temperature sensor shows 15° C., NDP would be 7.59 bar and NDPTc would be 5.57 bar for a membrane with TCF=0.734 at 15° C.

An alternative choice of the temperature corrected system variable (SVTc) may be a temperature corrected permeate flow (PFTc) being defined herein as:

$$PFTc = \frac{Q_p}{TCF},$$

wherein $Q_p$ denotes the permeate flow measured by permeate flow sensor 37b and TCF is the same temperature correction factor as described above. If $Q_f$ is 10.0 m³/h and TCF=0.747, then PTFc would be 13.39 m³/h.

Figure 2:
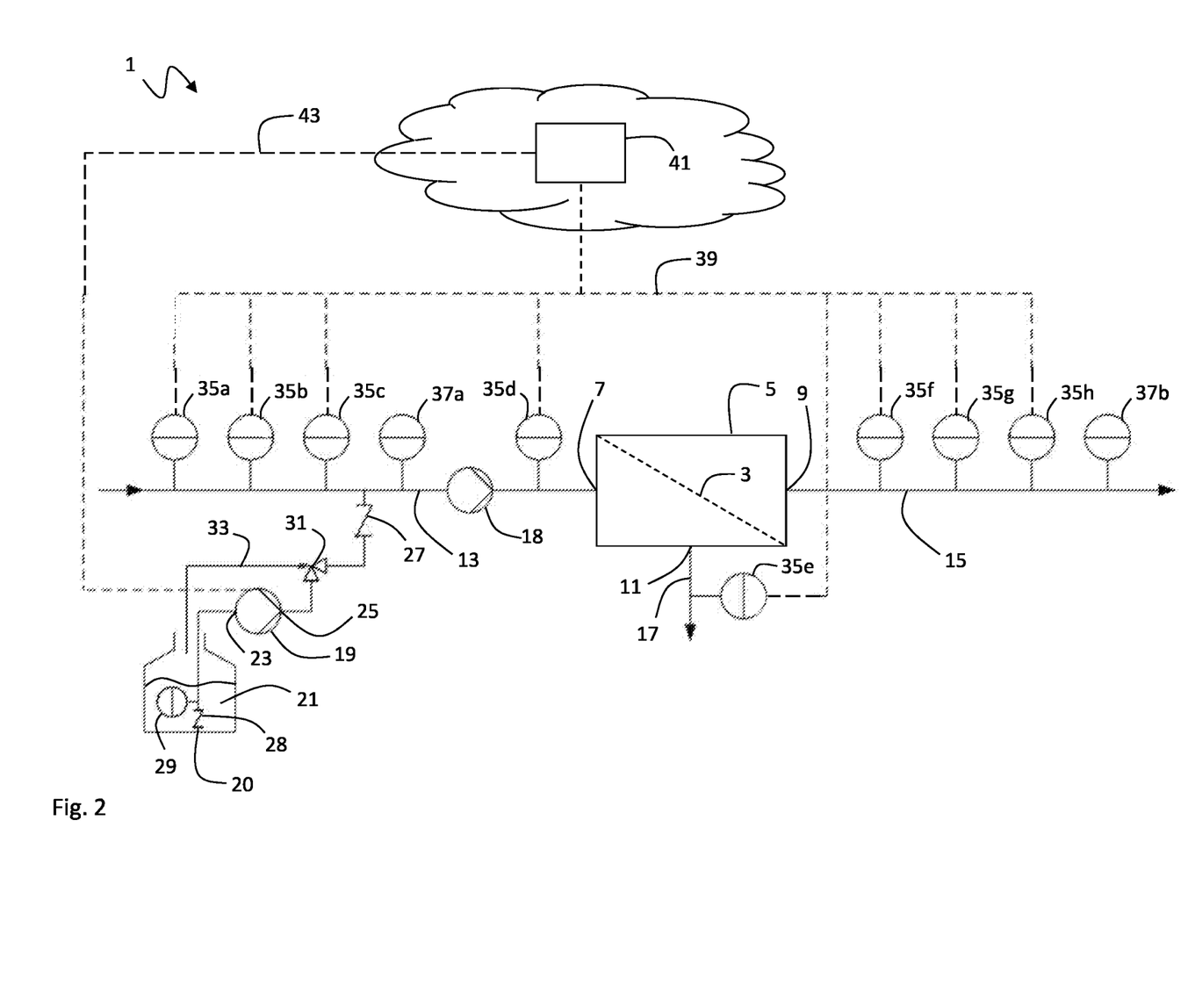
FIG. 2 is a schematic view showing a membrane-based water treatment system with an example of a second embodiment of the dosing system described herein.

FIG. 2 shows the membrane-based water treatment system 1 being equipped with a second embodiment of a dosing system for dosing antiscalant into the feed line 13 of the membrane-based water treatment system 1. The dosing system comprises here a calculation module 41 being remotely installed in a PLC or a cloud-based system. The calculation module 41 is here in signal communication with the sensors 35 via the wireless or cabled signal line 39 in order to receive the operational parameters and to calculate NDPTc. The calculation module 41 is also in signal communication with the control module of the dosing pump 19 via a wireless or cabled signal line 43. The calculation module 41 may send the determined NDPTc to the control module for processing within in a decision algorithm whether to increase or decrease the dosage of antiscalant. Alternatively, the calculation module 41 may at least partially process the decision algorithm whether to increase or decrease the dosage of antiscalant and send the according command to the control module of the dosing pump 19.

Figure 3A:
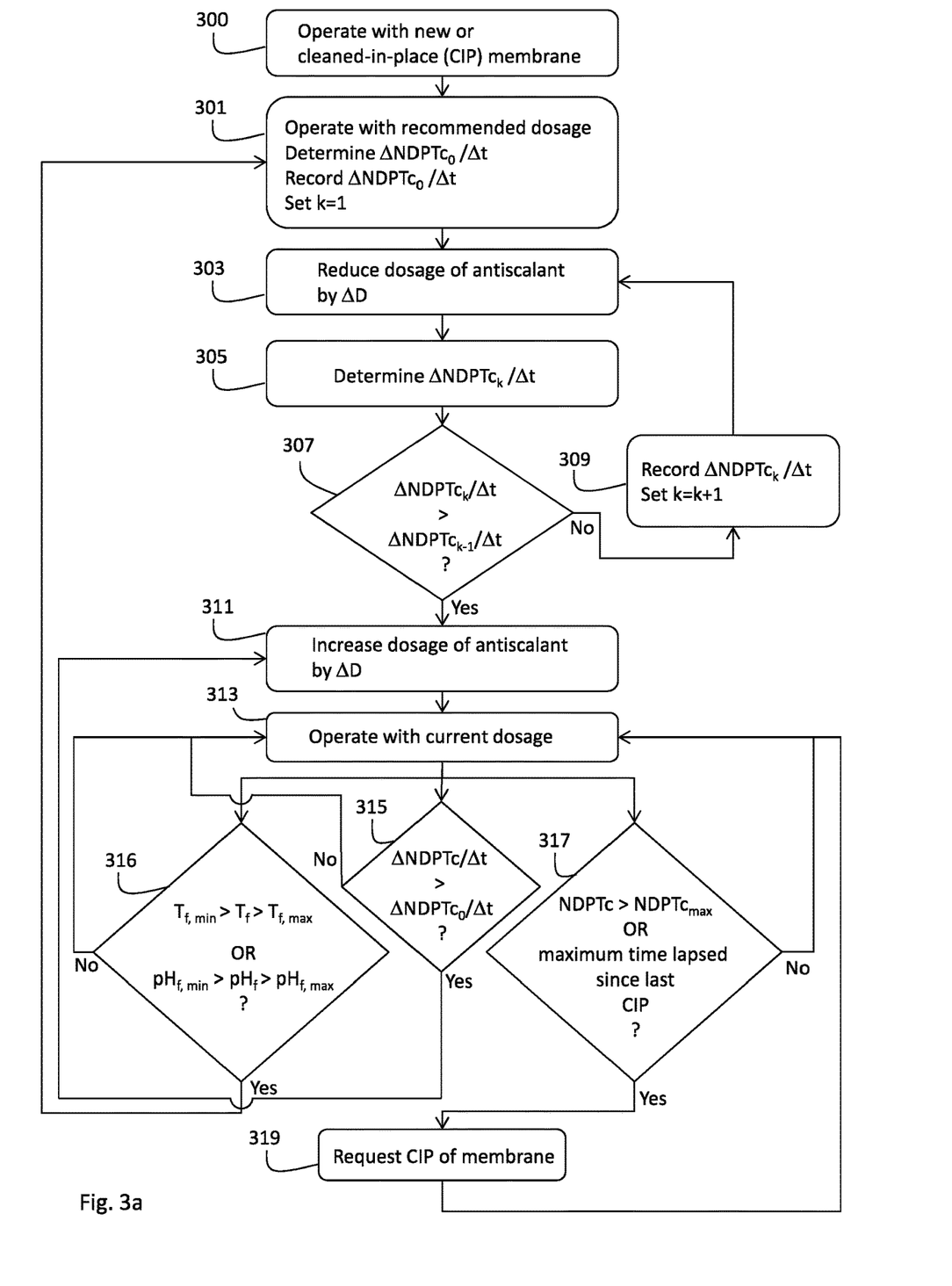
FIG. 3a is a flow diagram view showing a decision algorithm with an example of an embodiment of the method for dosing antiscalant into a membrane-based water treatment system described herein.

FIG. 3a shows schematically a decision algorithm processed by the control module of the dosing pump 19 and/or the calculation module 41. In a first step 300, the system is operated with a new or just cleaned-in-place (CIP) membrane or multiple-membrane system. In the next step 301, the dosing pump 19 is operated with the recommended dosage. Furthermore, the initial slope $\Delta NDPTc_0/\Delta t$ is determined in step 301.

Figure 4:
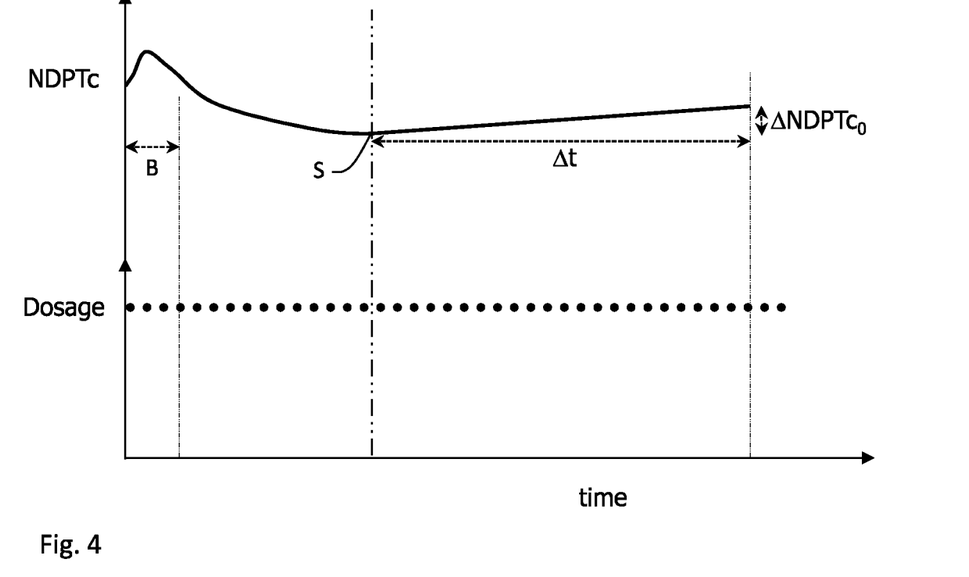
FIG. 4 is a combined diagram of NDPTc and antiscalant dosage over time when operation is started with a new membrane or after a cleaning-in-place (CIP) of the membrane.

FIG. 4 shows how the initial slope $\Delta NDPTc_0/\Delta t$ is determined. After a cleaning-in-place (CIP) of the membrane or after a new membrane is installed, a blanking time B is pre-defined for initial fluctuations of NDPTc to settle before it steadily reduces towards a stable level of NDPTc at point S. Once NDPTc starts to steadily increase at point S due to expected fouling of the membrane, $\Delta NDPTc_0$ is determined over a time interval Δt to determine the slope. The dosage is kept constant to the recommended level.

In step 301 in FIG. 3, the determined initial slope $\Delta NDPTc_0/\Delta t$ is recorded and a loop counter k is set to 1. In the next step 303, the dosage of antiscalant is reduced by ΔD. In the following step 305, the slope $\Delta NDPTc_{k=1}/\Delta t$ for loop k=1 is determined. The slope for loop 1 is then compared in step 307 with the initial slope. If the slope for loop 1 is not larger than the initial slope, the slope for loop 1 is recorded and the loop counter k increased to 2 in step 309. The loop is then repeated to restart at step 303 again with reducing the dosage of antiscalant by ΔD again. The loop exits when the slope of the current loop is larger than the previous slope. Then, the dosage of antiscalant is increased by ΔD in step 311. After step 311, a minimal dosage of antiscalant is found without having increased the slope $\Delta NDPTc/\Delta t$. The dosing pump 19 is thus operated with the current minimal dosage in step 313. During operation of the dosing pump 19 with the minimal dosage in step 313 one closed-loop control circle 315 and two monitoring circles 316, 317 are conducted by the decision algorithm. The closed-loop control circle 315 monitors the slope $\Delta NDPTc/\Delta t$ against the initial slope $\Delta NDPTc_0/\Delta t$. As long as the slope does not exceed the initial slope, the operation continues with the current dosage. If the slope exceeds the initial slope $\Delta NDPTc_0/\Delta t$, the dosage is increased by $\Delta D$ by jumping back to step 311. The first monitoring circle 316 monitors the feed temperature $T_f$ against a maximal threshold value and a minimal threshold value $T_{f,min}$, and the feed pH against a minimum threshold value $pH_{f,min}$ and a maximum threshold value $pH_{f,max}$. The first monitoring circle thus monitors if the feed temperature and feed pH are within ranges between the respective threshold values. If the feed temperature and/or feed pH are outside their range, a significant change in the feed conditions can be assumed and the algorithm jumps back to step 301 to re-determine the initial slope with the recommended dosage. The threshold values may be absolute or relative values. For instance, they can be pre-determined and/or user-set parameters. Alternatively, they can be relative deviations from an averaged or low-pass filtered value. The second monitoring circle 317 monitors the absolute value of NDPTc against a maximal threshold value $NDPTc_{max}$ and the overall time that has lapsed since the last cleaning-in-place (CIP) of the membrane. For this purpose, the control module and/or the calculation module 41 may comprise a timer that can be reset by a user or automatically when the membrane is being cleaned. If any one of these two thresholds is exceeded, a CIP may be requested in step 319 and operation continues as before with step 313. The decision algorithm restarts with the first step 300 after each CIP that has actually been performed upon the request.

Figure 3B:
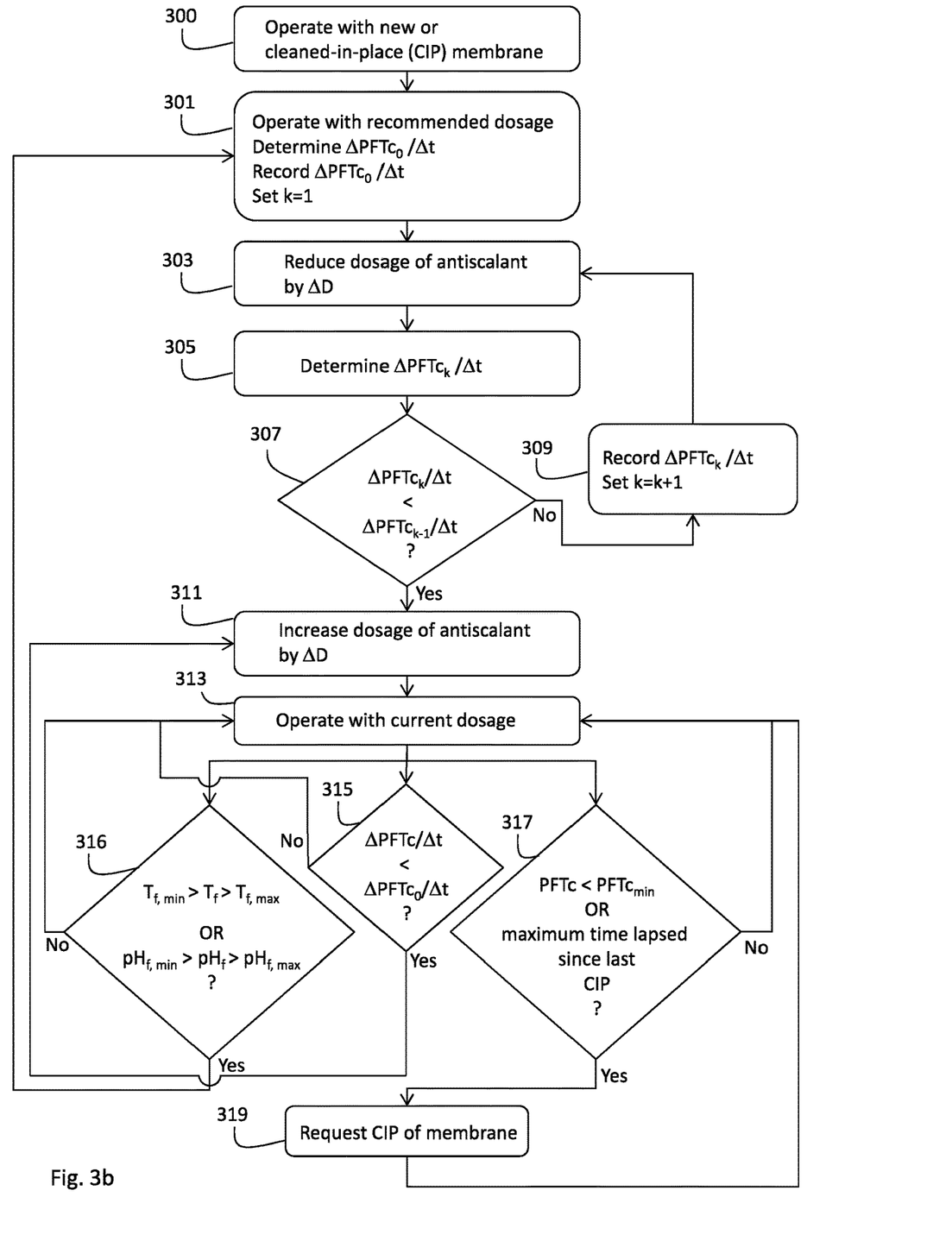
FIG. 3b is a flow diagram view showing a decision algorithm with an example of an embodiment of the method for dosing antiscalant into a membrane-based water treatment system described herein.

FIG. 3b shows schematically an analogous decision algorithm processed by the control module of the dosing pump 19 and/or the calculation module 41 in case the temperature corrected permeate flow PFTc is used as temperature corrected system variable SVTc. The algorithm differs at comparison steps 307, 315 and 317 to take into account the inverse behaviour of PFTc with respect to scaling. If a temperature corrected water permeability (KWTc) was used as SVTc, an algorithm according to FIG. 3b would be adequate. If a temperature corrected membrane resistance (RMTc) was used as SVTc, an algorithm according to FIG. 3a would be adequate.

Figure 5:
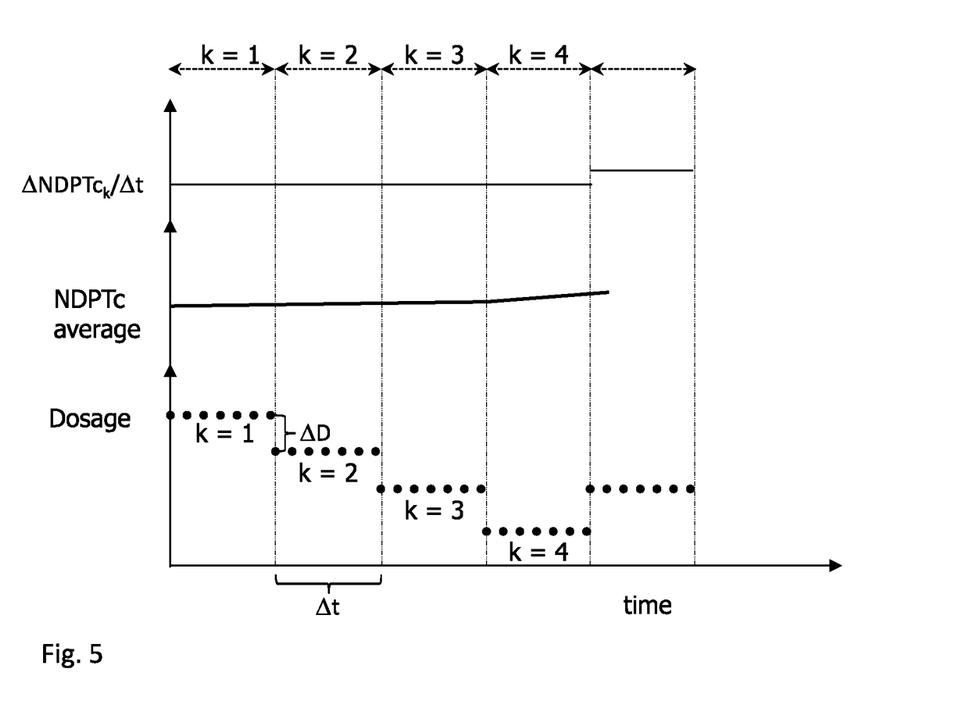
FIG. 5 is a combined diagram of ΔNDPTc/Δt, NDPTc and antiscalant dosage over time when the antiscalant dosage is reduced.

FIG. 5 shows in a diagram how the values of $\Delta NDPTc/\Delta t$, the average NDPTc and dosage develop during the loops 1 to 4 of steps 303, 305, 307 and 309 as described above. The dosage is reduced by $\Delta D$ between the loops until an increase of the slope $\Delta NDPTc/\Delta t$ is detected after loop 4. The dosage is increased again in step 311 to the value of loop 3, which is the minimal dosage without increasing the slope $\Delta NDPTc/\Delta t$. This is the minimal dosage the dosing pump 19 is operated with in step 313.

Figure 6:
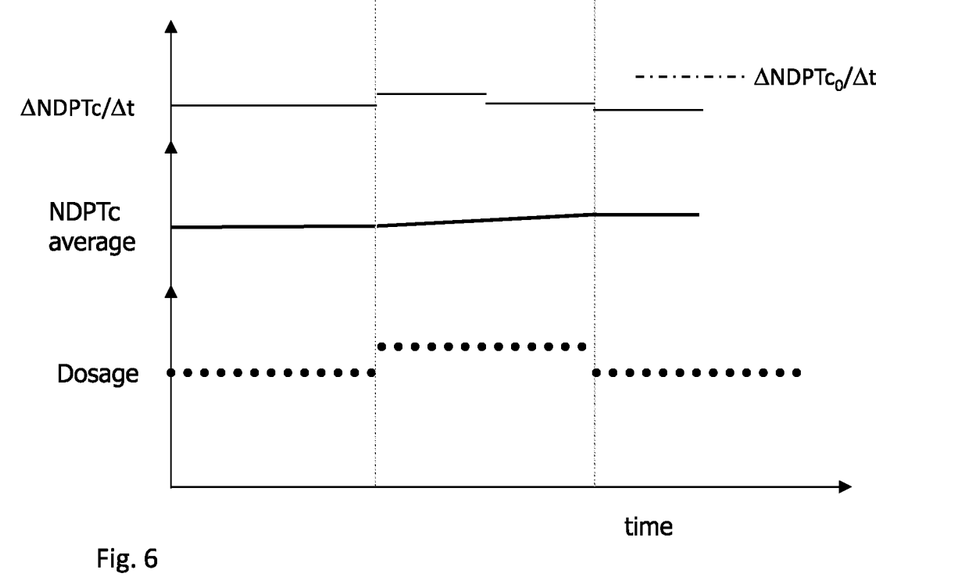
FIG. 6 is a combined diagram of ΔNDPTc/Δt, NDPTc and antiscalant dosage over time when the antiscalant dosage is increased and reduced again.

FIG. 6 shows in a diagram how the values of $\Delta NDPTc/\Delta t$, the average NDPTc and dosage may develop when the dosage is increased and a decrease in the slope $\Delta NDPTc/\Delta t$ is detected. The decision algorithm may comprise an additional step of monitoring if the slope $\Delta NDPTc/\Delta t$ has decreased after step 311 and jumps back to step 303 to reduce the dosage of antiscalant again by $\Delta D$. The result is visible in FIG. 6. The amount of dosage increase or decrease $\Delta D$ in the decision algorithm may be constant or variable, preferably decreasing between loops.

Figure 7:
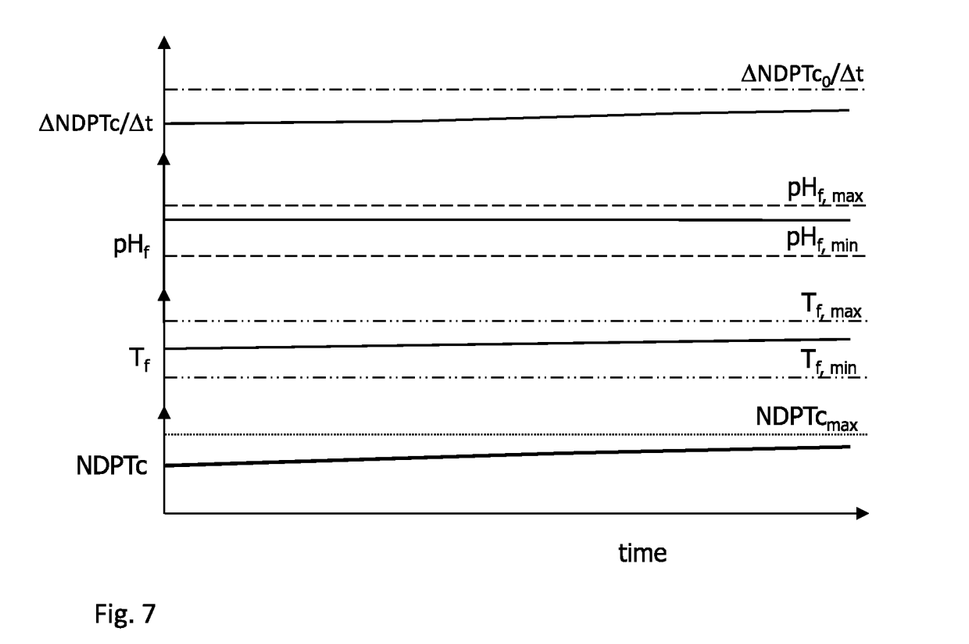
FIG. 7 is a combined diagram of monitored ΔNDPTc/Δt, $pH_f$, $T_f$ and NDPTc over time with respective thresholds.

FIG. 7 illustrates the variables $\Delta NDPTc/\Delta t$, $pH_f$, $T_f$ and NDPTc steadily increasing over time and being monitored against their respective maximum threshold values in circles 315, 316, 317. The feed temperature $T_f$ and the feed pH ($pH_f$) are also monitored against respective minimum threshold values ($T_{f,min}$, $pH_{f,min}$). It is thus monitored whether the feed temperature and feed pH are within ranges between the respective threshold values. If the feed temperature and/or feed pH are outside their range, a significant change in the feed conditions can be assumed and the initial slope $\Delta NDPTc_0/\Delta t$ is re-determined by operating with the recommended dosage. The threshold values may be absolute or relative values. For instance, they can be pre-determined and/or user-set parameters. Alternatively, they can be relative deviations from an averaged or low-pass filtered value, e.g. the direct measured value of $T_f$ may be compared with a range of ±10% of a low-pass filtered or averaged $\overline{T_f}$ value, i.e. $T_{f,min}=0.9\cdot\overline{T_f}$ and $T_{f,max}=1,1\cdot\overline{T_f}$. Analogously, the direct measured value of $pH_f$ may be compared with a range of ±10% of a low-pass filtered or averaged $\overline{pH_f}$ value, i.e. $pH_{f,min}=0.9\cdot\overline{pH_f}$ and $pH_{f,max}=1,1\cdot\overline{pH_f}$.

Figure 8:
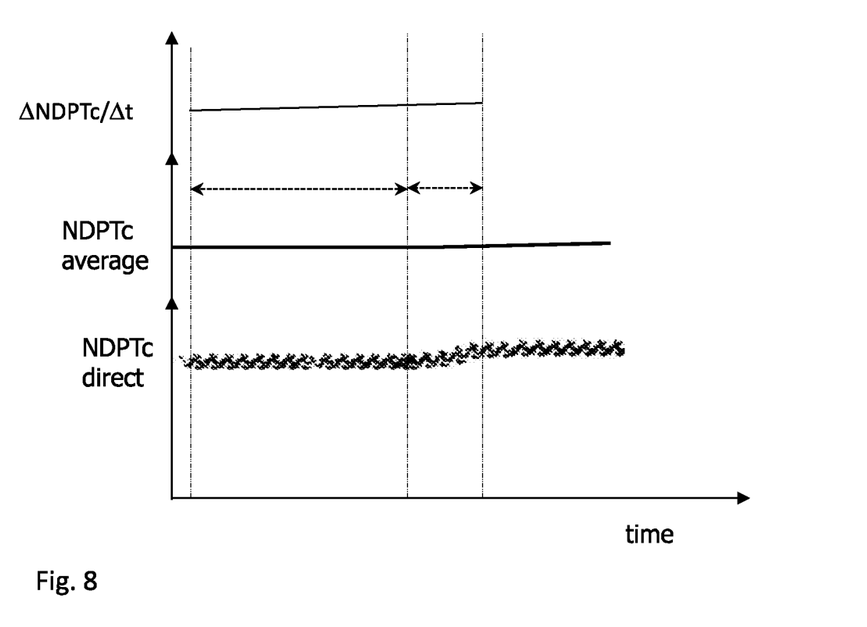
FIG. 8 is a combined diagram of ΔNDPTc/Δt, average NDPTc and direct NDPTc over time.

FIG. 8 shows how the slope $\Delta NDPTc/\Delta t$ may be determined from average values within a sliding time window. The direct NDPTc fluctuates statistically and may be sampled at a certain sampling rate. For instance, the direct NDPTc may be sampled at a sampling rate of 1 Hz over a sliding window of 16 seconds. Thus, 16 values of direct NDPTc may be recorded for the sliding window. The first 12 samples may be averaged to $NDPTc_1$ of a first window part and the last 4 samples may be averaged to $NDPTc_2$ of a second window part. $\Delta NDPTc/\Delta t$ may then be determined as $(NDPTc_2-NDPTc_1)/8$ s. The window slides with time and thus yields a slope $\Delta NDPTc/\Delta t$ every second. Analogously, average values for other monitored variables like feed pH ($pH_f$) or feed temperature $T_f$ may be averaged over a sliding time window. Alternatively or in addition, a low-pass filter may be used to reduce noise on the received signals.

The skilled reader will readily understand that FIGS. 4 to 8 could be drawn up analogously for PFTc and $\Delta PFTc/\Delta t$ with inverse behavior compared to NDPTc and $\Delta NDPTc/\Delta t$.

Where, in the foregoing description, integers or elements are mentioned which have known, obvious or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as optional, preferable, advantageous, convenient or the like are optional and do not limit the scope of the independent claims.

The above embodiments are to be understood as illustrative examples of the disclosure. It is to be understood that any feature described in relation to any one embodiment may be used alone, or in combination with other features described, and may also be used in combination with one or more features of any other of the embodiments, or any combination of any other of the embodiments. While at least one exemplary embodiment has been shown and described, it should be understood that other modifications, substitutions and alternatives are apparent to one of ordinary skill in the art and may be changed without departing from the scope of the subject matter described herein, and this application is intended to cover any adaptations or variations of the specific embodiments discussed herein.

In addition, "comprising" does not exclude other elements or steps, and "a" or "one" does not exclude a plural number. Furthermore, characteristics or steps which have been described with reference to one of the above exemplary embodiments may also be used in combination with other characteristics or steps of other exemplary embodiments described above. Method steps may be applied in any order or in parallel or may constitute a part or a more detailed version of another method step. It should be understood that there should be embodied within the scope of the patent warranted hereon all such modifications as reasonably and properly come within the scope of the contribution to the art. Such modifications, substitutions and alternatives can be made without departing from the spirit and scope of the disclosure, which should be determined from the appended claims and their legal equivalents.

While specific embodiments of the invention have been shown and described in detail to illustrate the application of the principles of the invention, it will be understood that the invention may be embodied otherwise without departing from such principles.

What is claimed is:

1. A method for dosing antiscalant into a membrane-based water treatment system, the method comprising the steps of:
   determining a temperature corrected system variable based on a plurality of operating variables of the membrane-based water treatment system, wherein the temperature corrected system variable includes a temperature correction, the temperature corrected system variable being dependent on scaling of a membrane of the membrane-based water treatment system; and
   varying the dosage of antiscalant fed into the membrane-based water treatment system based on the temperature corrected system variable, wherein varying the dosage comprises adapting the dosage of antiscalant fed into the membrane-based water treatment system upon a change of a first time derivative of the temperature corrected system variable.

2. The method according to claim 1, wherein the plurality of operating variables of the membrane-based water treatment system comprises at least one operating variable of the group of operating variables consisting of: feed pressure, feed electrical conductivity, feed temperature, feed pH, difference between feed pressure and concentrate pressure, permeate pressure, permeate temperature and permeate electrical conductivity.

3. The method according to claim 2, wherein the step of varying the dosage comprises recursively adapting the dosage of antiscalant fed into the membrane-based water treatment system based on a previously determined value of the temperature corrected system variable as feedback value.

4. The method according to claim 1, wherein the temperature corrected system variable is a temperature corrected net driving pressure including the temperature correction, or a temperature corrected permeate flow including the temperature correction, or a temperature corrected net driving pressure including the temperature correction and a temperature corrected permeate flow including the temperature correction, or a combination of a temperature corrected net driving pressure including the temperature correction and a temperature corrected permeate flow including the temperature correction.

5. The method according to claim 4, wherein the step of varying the dosage comprises recursively reducing the dosage of antiscalant fed into the membrane-based water treatment system as long as a first time derivative of the temperature corrected net driving pressure does not increase or as long as a first time derivative of the temperature corrected permeate flow does not decrease or as long as the first time derivative of the temperature corrected net driving pressure does not increase and the first time derivative of the temperature corrected permeate flow does not decrease.

6. The method according to claim 4, wherein the step of varying the dosage comprises increasing the dosage of antiscalant fed into the membrane-based water treatment system if a first time derivative of the temperature corrected net driving pressure has increased or if a first time derivative of the temperature corrected permeate flow has decreased or if the first time derivative of the temperature corrected net driving pressure has increased and the first time derivative of the temperature corrected permeate flow has decreased.

7. The method according to claim 4, wherein the step of varying the dosage comprises recursively increasing the dosage of antiscalant pumped into the membrane-based water treatment system as long as a first time derivative of the temperature corrected net driving pressure is above an initial first time derivative or as long as a first time derivative of the temperature corrected permeate flow is below an initial first time derivative or as long as the first time derivative of the temperature corrected net driving pressure is above an initial first time derivative and the first time derivative of the temperature corrected permeate flow is below an initial first time derivative.

8. The method according to claim 4, further comprising the steps of:
   monitoring the temperature corrected net driving pressure against a maximum threshold value or monitoring the temperature corrected permeate flow against a minimum threshold value or monitoring the temperature corrected net driving pressure against a maximum threshold value and monitoring the temperature corrected permeate flow against a minimum threshold value; and
   initiating a cleaning-in-place of a membrane if the temperature corrected net driving pressure exceeds the maximum threshold value or if the temperature corrected permeate flow falls below the minimum threshold value or if the temperature corrected net driving pressure exceeds the maximum threshold value and the temperature corrected permeate flow falls below the minimum threshold value.

9. The method according to claim 1, further comprising the steps of:
   monitoring a feed temperature against a minimum threshold value and a maximum threshold value;
   monitoring a feed pH against a minimum threshold value and a maximum threshold value; and
   resetting the dosage of antiscalant to an initial value if the feed temperature or the feed pH exceed the respective maximum threshold value or falls below the respective minimum threshold value or if the feed temperature and the feed pH exceed the respective maximum threshold value or falls below the respective minimum threshold value.

10. A method for dosing antiscalant into a membrane-based water treatment system, the method comprising the steps of:
    determining a temperature corrected system variable based on a plurality of operating variables of the membrane-based water treatment system, wherein:
    the temperature corrected system variable includes a temperature correction based on a measured temperature at the membrane-based water treatment system, the temperature corrected system variable being dependent on scaling of a membrane of the membrane-based water treatment system; and
    the temperature corrected system variable is a temperature corrected net driving pressure including the temperature correction, or a temperature corrected permeate flow including the temperature correction, or a temperature corrected net driving pressure including the temperature correction and a temperature corrected permeate flow including the temperature correction, or a combination of a temperature corrected net driving pressure including the temperature correction and the temperature corrected permeate flow including the temperature correction; and varying the dosage of antiscalant fed into the membrane-based water treatment system based on the temperature corrected system variable comprising recursively reducing the dosage of antiscalant fed into the membrane-based water treatment system as long as the slope a first time derivative of the temperature corrected net driving pressure does not increase or as long as the slope a first time derivative of the temperature corrected permeate flow does not decrease or as long as the slope first time derivative of the temperature corrected net driving pressure does not increase and the slope first time derivative of the temperature corrected permeate flow does not decrease.

11. The method according to claim 10, wherein the step of varying the dosage further comprises increasing the dosage of antiscalant fed into the membrane-based water treatment system if a first time derivative of the temperature corrected net driving pressure has increased or if a first time derivative of the temperature corrected permeate flow has decreased or if the first time derivative of the temperature corrected net driving pressure has increased and the first time derivative of the temperature corrected permeate flow has decreased.

12. The method according to claim 11, wherein the plurality of operating variables of the membrane-based water treatment system comprises at least one operating variable of the group of operating variables consisting of: feed pressure, feed electrical conductivity, feed temperature, feed pH, difference between feed pressure and concentrate pressure, permeate pressure, permeate temperature and permeate electrical conductivity.

13. The method according to claim 10, wherein the step of varying the dosage comprises recursively adapting the dosage of antiscalant fed into the membrane-based water treatment system based on a previously determined value of the temperature corrected system variable as feedback value.

14. The method according to claim 10, wherein the step of varying the dosage comprises recursively increasing the dosage of antiscalant pumped into the membrane-based water treatment system as long as a first time derivative of the temperature corrected net driving pressure is above an initial first time derivative or as long as a first time derivative of the temperature corrected permeate flow is below the initial first time derivative or as long as the first time derivative of the temperature corrected net driving pressure is above an initial first time derivative and the first time derivative of the temperature corrected permeate flow is below an initial first time derivative.

15. The method according to claim 10, further comprising the steps of:
monitoring the temperature corrected net driving pressure against a maximum threshold value or monitoring the temperature corrected permeate flow against a minimum threshold value or monitoring the temperature corrected net driving pressure against a maximum threshold value and monitoring the temperature corrected permeate flow against a minimum threshold value; and
initiating a cleaning-in-place of a membrane if the temperature corrected net driving pressure exceeds the maximum threshold value or if the temperature corrected permeate flow falls below the minimum threshold value or if the temperature corrected net driving pressure exceeds the maximum threshold value and the temperature corrected permeate flow falls below the minimum threshold value.

16. The method according to claim 10, further comprising the steps of:
monitoring the feed temperature against a minimum threshold value and a maximum threshold value;
monitoring the feed pH against a minimum threshold value and a maximum threshold value; and
resetting the dosage of antiscalant to an initial value if the feed temperature or the feed pH exceed the respective maximum threshold value or falls below the respective minimum threshold value or if the feed temperature and the feed pH exceed the respective maximum threshold value or falls below the respective minimum threshold value.

17. A method for dosing antiscalant into a membrane-based water treatment system, the method comprising the steps of:
determining a temperature corrected system variable based on a plurality of operating variables of the membrane-based water treatment system, wherein the temperature corrected system variable includes a temperature correction factor based on a measured temperature of a feed temperature and the plurality of operating variables of the membrane-based water treatment system comprises at least one operating variable of the group of operating variables consisting of: feed pressure, feed electrical conductivity, water feed temperature, feed pH, difference between feed pressure and concentrate pressure, permeate pressure, permeate temperature and permeate electrical conductivity, the temperature corrected system variable being dependent on scaling of a membrane of the membrane-based water treatment system; and
varying the dosage of antiscalant fed into the membrane-based water treatment system based on the temperature corrected system variable, wherein varying the dosage comprises adapting the dosage of antiscalant fed into the membrane-based water treatment system upon a change of a first time derivative of the temperature corrected system variable.

18. The method according to claim 17, wherein the step of varying the dosage comprises recursively adapting the dosage of antiscalant fed into the membrane-based water treatment system based on a previously determined value of the temperature corrected system variable as feedback value.

19. The method according to claim 17, wherein the temperature corrected system variable is a temperature corrected net driving pressure including the temperature correction, or a temperature corrected permeate flow including the temperature correction, or a temperature corrected net driving pressure including the temperature correction and a temperature corrected permeate flow including the temperature correction, or a combination of a temperature corrected net driving pressure including the temperature correction and a temperature corrected permeate flow including the temperature correction.

20. The method according to claim 19, wherein the step of varying the dosage comprises recursively reducing the dosage of antiscalant fed into the membrane-based water treatment system as long as a first time derivative of the temperature corrected net driving pressure does not increase or as long as a first time derivative of the temperature corrected permeate flow does not decrease or as long as the first time derivative of the temperature corrected net driving pressure does not increase and the first time derivative of the temperature corrected permeate flow does not decrease.

* * * * *